(12) United States Patent   (10) Patent No.: US 8,213,788 B2
Soll et al.   (45) Date of Patent: Jul. 3, 2012

(54) VIEWFINDER

(76) Inventors: David B. Soll, Ambler, PA (US);
Richard E. Feinbloom, New York, NY (US)

( * ) Notice: Subject to any disclaimer, the term of this patent is extended or adjusted under 35 U.S.C. 154(b) by 0 days.

(21) Appl. No.: 12/927,895

(22) Filed: Nov. 29, 2010

(65) Prior Publication Data

US 2012/0134662 A1    May 31, 2012

(51) Int. Cl.
*G03B 13/02* (2006.01)
(52) U.S. Cl. ......................... 396/373; 396/375
(58) Field of Classification Search .......... 396/373–375, 396/544; 348/373; 248/226.11, 229.12, 248/229.14, 229.15, 229.2, 229.22–229.26
See application file for complete search history.

(56) References Cited

U.S. PATENT DOCUMENTS

| | | | |
|---|---|---|---|
| 4,216,589 A * | 8/1980 | Beaver | ............................. 33/266 |
| 6,038,409 A | 3/2000 | Shono | |
| 6,714,737 B2 | 3/2004 | Ichinokawa | |
| 6,900,840 B1 | 5/2005 | Schinner et al. | |
| 6,952,232 B2 | 10/2005 | Ko et al. | |
| 7,397,501 B2 | 7/2008 | Afsenius | |
| D606,108 S | 12/2009 | Feinbloom et al. | |
| 2003/0156835 A1 | 8/2003 | Loo | |
| 2004/0257458 A1 | 12/2004 | Huang et al. | |
| 2005/0275742 A1 | 12/2005 | Baron | |
| 2006/0170817 A1 * | 8/2006 | Wu | ............................... 348/373 |
| 2007/0297787 A1 | 12/2007 | Arai | |

* cited by examiner

*Primary Examiner* — W. B. Perkey
*Assistant Examiner* — Minh Phan
(74) *Attorney, Agent, or Firm* — Law Office of Carl Giordano, PA

(57) ABSTRACT

A viewfinder including a base member for removably mounting on an electronic device suitable for taking digital photographs, attachment means connected to said base member for coupling the base member to an electronic device, an open-ended housing disposed on the base member, and a sighting grid disposed adjacent an open end of the open-ended housing and method for using same is provided.

7 Claims, 3 Drawing Sheets

VIEWFINDER

FIELD OF THE INVENTION

The invention relates generally to viewfinders, and more particularly, to viewfinders for electronic devices suited for taking digital photographs.

BACKGROUND OF THE INVENTION

Digital photography is popular worldwide, yet many digital compact cameras do not have viewfinders. Viewfinders are used to compose and frame a scene. When present, the viewfinder on a digital camera may be either an optical viewfinder that works through the lens, or an electronic viewfinder, which is a small LCD, both of which are formed as an integral part of the camera. Optical viewfinders have disadvantages, however, since the viewfinder shows only about 70-75% of what the camera lens actually "sees". The electronic viewfinder also has disadvantages, as it may not be as clear as an optical viewfinder, but it does show the entire area to be photographed. In view of the problems associated with viewfinders, it is becoming increasingly difficult to find a commercially-available digital camera with a viewfinder.

When no viewfinder is present on a camera, many use the LCD screen to frame a shot for a photograph. Cellular telephones also have an LCD screen which may be used to frame a scene. Digital cameras or cellular telephones that have only an LCD screen and no viewfinder may cause the photographer using the device to hold it approximately 18 inches or at arm's length from the eyes so the image is visible on the LCD screen, but the photographer can only estimate the focus and composition of the image at this distance. Viewing the LCD screen can be difficult also in brightly-lighted and sunlit areas, as there can be significant glare on the viewing screen, leaving the photographer with the need to use a hand or other device to shade the LCD screen.

Thus, there remains a need for viewfinders for electronic devices suited for taking digital photographs.

SUMMARY OF THE INVENTION

Figure 1:
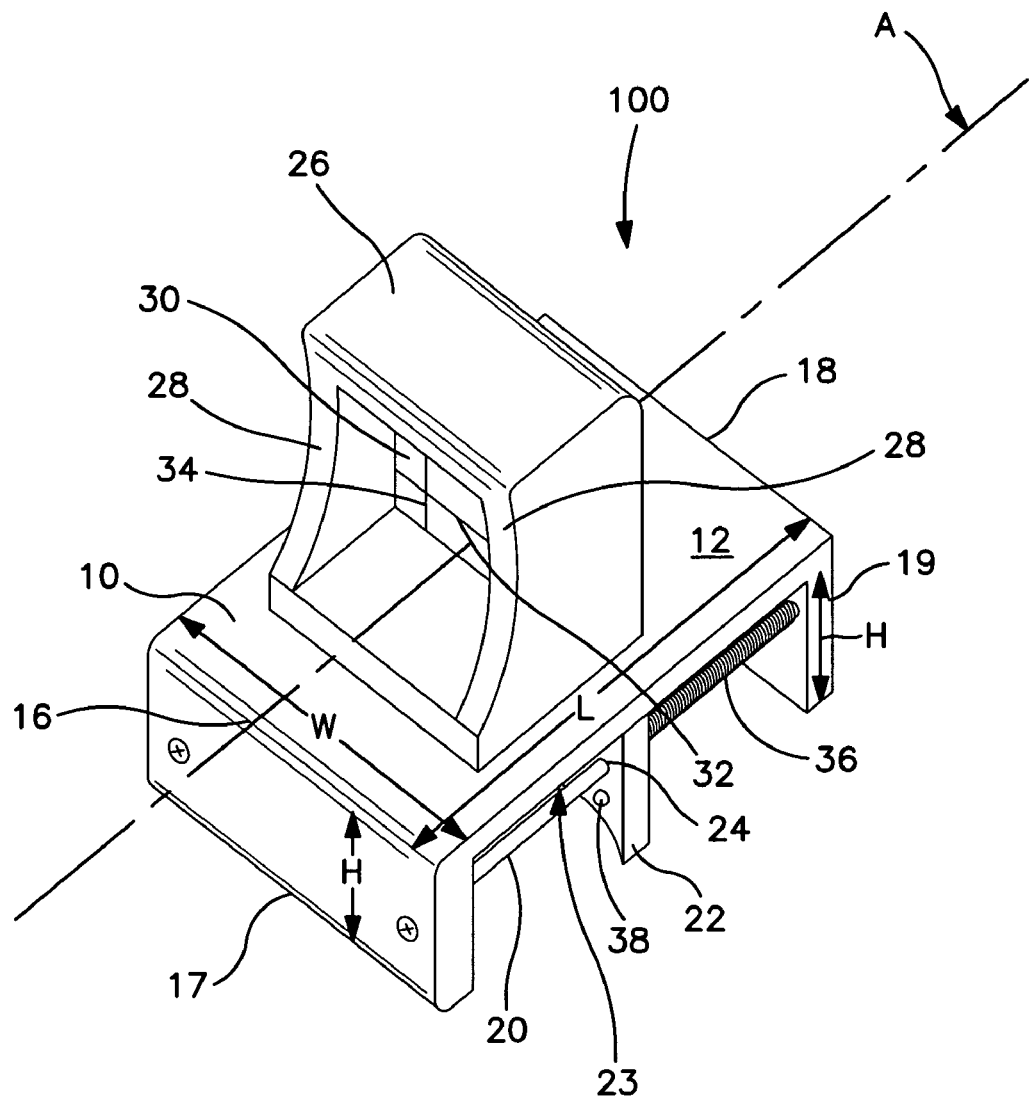
FIG. 1 is an elevational view of the device according to an aspect of the invention.

According to an aspect of the invention, a viewfinder including a base member for removably mounting on an electronic device suitable for taking digital photographs, attachment means connected to the base member for coupling the base member to an electronic device, an open-ended housing disposed on the base member, and a sighting grid disposed adjacent an open end of the open-ended housing is disclosed.

According to another aspect of the invention, a viewfinder for removably mounting onto an electronic device suitable for taking digital photographs includes a substantially rectangular base member, including a substantially planar top surface and a substantially planar bottom surface, a first end including a first downwardly extending rod supporting member, a second end including a second downwardly extending rod supporting member, and two rods disposed adjacent the substantially planar bottom surface and extending from the first end to the second end of the base member; a downwardly extending sliding member disposed between the first end and the second end and slidably coupled to said substantially rectangular base member by the two rods; a housing disposed on the top planar surface of the base member, the housing including a sighting grid is also disclosed.

According to another aspect of the invention, a method for using a removably mounted viewfinder on an electronic device includes disposing a viewfinder on an electronic device suitable for taking digital photographs, the viewfinder including a base member for removably mounting on an electronic device, a sliding member slidably connected to the base member, an open-ended housing disposed on the base member, and a sighting grid disposed adjacent an open end of the open-ended housing; viewing an image through the sighting grid; and capturing the image by taking a photograph using the electronic device is also disclosed.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In all instances, the terms "about" may include numbers that are rounded to the nearest significant figure.

Referring to FIG. 1, according to an aspect of the invention, a viewfinder 100 including a base member 10 for removably mounting on an electronic device is illustrated. The base member 10 includes a top surface 12 and a bottom surface 14 (FIG. 2), both of which may be substantially planar. Base member 10 also includes a first end 16 and a second end 18. The first end 16 and second end 18 each include rod support members 17 and 19, respectively. Rod support members 17 and 19 extend downwardly from the first end 16 and second end 18, respectively. According to an aspect of the invention, the second rod support member 19 may be shorter in height than the first rod support member 17.

Figure 2:
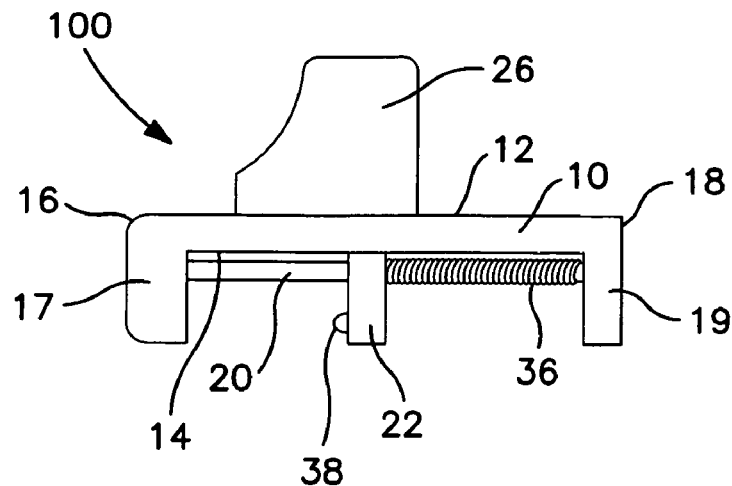
FIG. 2 is a side view of the device according to an aspect of the invention.

One or more rods 20 are coupled to the base member 10 by a suitable attachment device, depicted in FIG. 1 as screws. Other alternative and conventional means for attachment of the rods 20 may also be used. The rods 20 may be formed of a suitable material, for example, metal or rigid plastic. As illustrated in FIG. 2, the rods 20 are disposed adjacent the bottom surface 14 of the viewfinder 100.

Referring to FIG. 1, a spring-like wire 36 is disposed about each of the one or more rods 20. The spring-like wire 36 is disposed along a length of a rod between the second rod support member 19 and the sliding member 22.

Referring to FIG. 1, coupled to the base member 10 is a sliding member 22. The sliding member 22 includes one or more apertures 24 extending from one side of the member 22 to the opposite side, for receiving one or more rods 20. The rods 20 also provide for the slidable coupling of the sliding member 22 to the base member 10. The sliding member 22 as illustrated in FIG. 1 is disposed on the viewfinder 100 between the rod support members 17 and 19. A first rod 20 is illustrated as extending through a corresponding aperture 24 in the sliding member 22. A second rod 20 in parallel with the first rod 20 is also present on the viewfinder 100, although one centrally-located rod 20 may be suitable for use according to an aspect of the invention.

The sliding member 22 may further include one or more stops 38. Stops 38 may be substantially hemi-spherical in shape, although other configurations are envisioned. For example, the stops may be square rubber pads, or formed of other suitable material, including rigid or semi-rigid foam. As illustrated, the stops 38 are disposed adjacent the bottom of the sliding member 22 on the side facing the first end 16 and rod support member 17.

Sliding member 22 also may include a cutaway portion 23 to provide ease in grasping and moving the sliding member 22. It should be understood that although the cutaway portion 23 as illustrated is arc-shaped, any suitable geometric shape may be used.

Referring still to FIG. 1, disposed on the top surface 12 of the base member is a housing 26. The housing 26 is open at both ends, and is substantially rectangular. At one open end of the housing 26 there are slightly curved portions 28, and at the opposite, open end of the housing 26 a sighting grid 30 is disposed.

The sighting grid 30 may include one or more horizontal lines 32 intersecting with one or more vertical lines 34. The sighting grid 30 may be used to center a subject or to use as a guide in preventing parallax error, as herein described. Although the sighting grid 30 is described as including one or more horizontal lines intersecting with one or more vertical lines, it should be understood that different orientations for the sighting grid 30 are possible. For example, the lines may intersect to form triangles, parallelograms, and other geometrical shapes.

The base member 10 and the housing 26 may be formed of a rigid plastic material, to provide sufficient rigidity to the viewfinder 100 and to maintain the integrity of the viewfinder 100 on an electronic device. The rigid plastic may be molded. Suitable materials include, but are not limited to: polyethylene, polypropylene, and silicon. Although a rigid plastic is described, other suitable, lightweight materials may also be employed.

Suitable dimensions for base member 10 of the viewfinder include, but are not limited to: from about 1¾ to about 2 inches in length, and about 1½ to about 1¾ inches in width. The dimensions of the housing 26 are from about ¾ inch at the interface of the housing 26 with the top surface 12 of the base member 10, and about ½ inch at the opposite end thereof. The height of the housing is about ¾ inch to about 1 inch. It should be understood that the dimensions of the device are not critical, and may be modified to accommodate the different widths and shapes of electronic devices.

Figure 3:
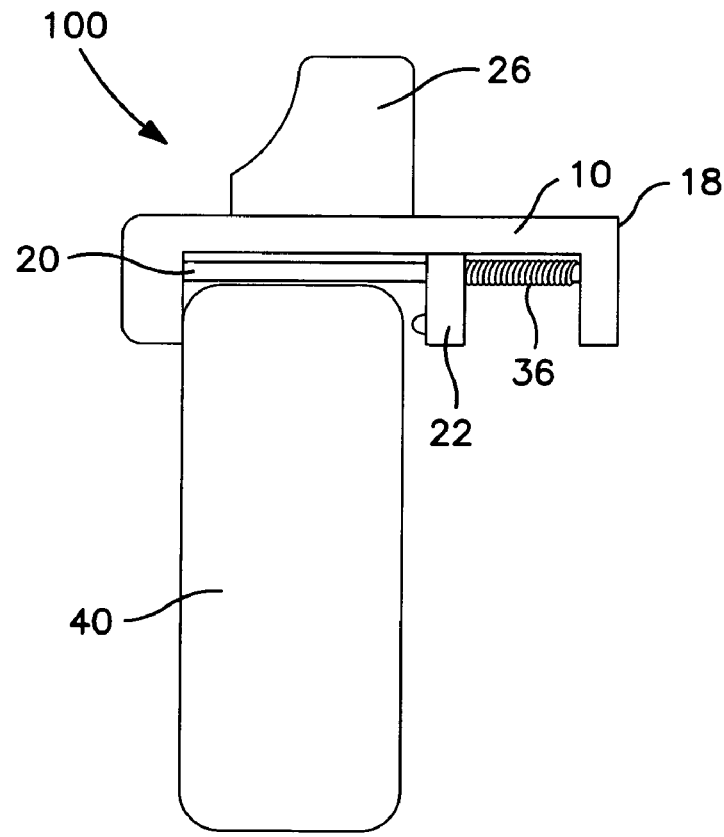
FIG. 3 is a side view of the device disposed on an electronic device.

Referring to FIGS. 2 and 3, the movement of the sliding member 22 and mounting of the viewfinder 100 on an electronic device 40 is illustrated. In FIG. 2, a side view of the sliding member 22 is illustrated. To mount the viewfinder 100 on an electronic device 40, the sliding member 22 is pushed or pulled along the one or more rods 20 toward the second end 18 of the base member 10, which compresses the spring-like wire 36. When the sliding member 22 is moved a sufficient distance to receive an electronic device 40, the sliding member 22 is released, and the spring-like wire 36 helps maintain the viewfinder 100 in place. When present, the stops 38 also help maintain the viewfinder 100 on the device 40. The viewfinder 100 is easily removed by moving the sliding member 22 toward the second end 18 of the base member 10, and removing the viewfinder 100 from the device 40.

Figure 4:
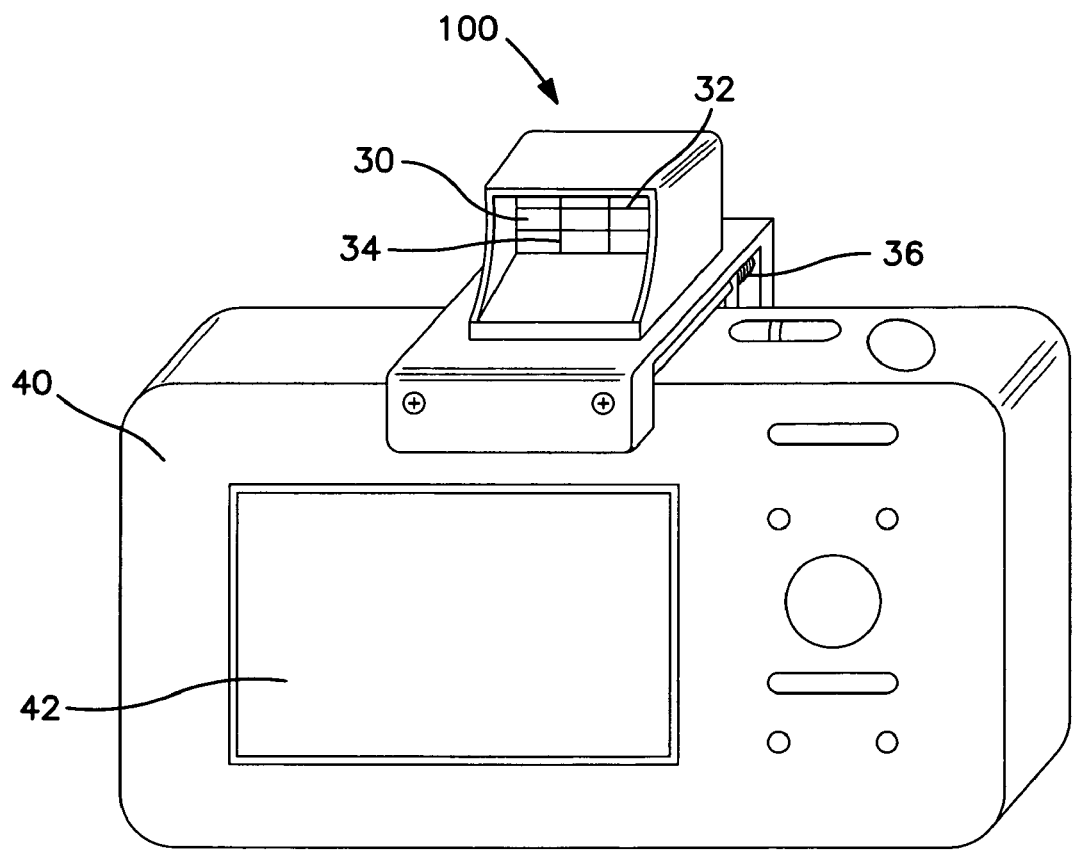
FIG. 4 is a back view of the device disposed on an electronic device.

As illustrated in FIG. 4, a viewfinder 100 is illustrated, in context, on a digital camera. The viewfinder 100 may be used on an electronic device suitable for taking digital photographs 40, including digital cameras and cellular telephones. As described herein, the viewfinder 100 may also be used on a suitable cellular telephone that includes a similar viewing screen 42. As illustrated, the viewfinder 100 is mounted perpendicular to the body of the camera, and is not disposed at an angle, i.e., the central axis A (FIG. 1) of the viewfinder 100 is parallel with the central axis of the camera lens.

During photography, there may be slight difference between the frame which is shot by the camera or cell phone, and the frame seen through the viewfinder. The difference is referred to as parallax error. Parallax is an apparent difference or displacement in the position of an object when viewed along two different lines of sight. The difference or displacement is measured in terms of the angle of inclination between the different lines of sight. Since the viewfinder will likely be located about one inch above or to the side of the lens, one using the viewfinder will see the subject from a slightly different angle than the lens. In order to correct the error, it should be understood that one taking the photographs may need to take several photographs to identify the amount of difference, particularly when taking macro photographs. In doing so, the lines of the sighting grid may be suitably used to assist the user to correct the apparent difference. The problem does not tend to occur when taking long-range photographs, as the difference is almost unnoticeable at long distances.

Advantageously, the removably mountable viewfinder 100 according to the invention is easy to place on a camera or cell phone, is easy to carry as it takes up minimal space, is inexpensive and easy to manufacture, and helps one in taking digital photographs, particularly in brightly-lit areas. For example, a user may direct a viewfinder disposed on a suitable electronic device toward an image, including a person, a landscape, or an object. Using the lines of the grid as a guide, one may take a photograph without having to look at the LCD or other type of viewing screen. As a further advantage, by using the viewfinder, one can steady the camera or cellular phone by bracing it against or close to the face, making the camera or phone less prone to shake.

The invention has been described with reference to specific embodiments. One of ordinary skill in the art, however, appreciates that various modifications and changes can be made without departing from the scope of the invention as set forth in the claims. For example, the sighting grid is described without a lens, although a suitable lens may also be disposed in the housing of the viewfinder according to an aspect of the invention. In addition, other means of attachment, whether permanent or by other conventional removable mechanisms may also be used. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A viewfinder for removably mounting onto an electronic device suitable for taking digital photographs, comprising:
   a substantially rectangular base member comprising:
      a substantially planar top surface and a substantially planar bottom surface;
      a first end including a first downwardly extending rod supporting member;
      a second end including a second downwardly extending rod supporting member; and
      two rods disposed adjacent said substantially planar bottom surface and extending from said first end to said second end of said base member;
   a downwardly extending sliding member disposed between said first end and said second end and slidably coupled to said substantially rectangular base member by said two rods; and
   a housing disposed on the top planar surface of said base member, said housing comprising a sighting grid.

2. The viewfinder according to claim 1, wherein said viewfinder further includes a spring-like wire disposed about each of said two rods, said spring-like wire disposed between said second downwardly extending rod supporting member and said downwardly extending sliding member.

3. The viewfinder according to claim 1, wherein said sighting grid comprises one or more horizontal lines intersecting with one or more vertical lines.

4. The viewfinder according to claim 1, wherein said sliding member further comprises one or more stops.

5. The viewfinder according to claim 1, wherein said downwardly extending sliding member includes a cutaway portion.

6. The viewfinder according to claim 1, wherein said electronic device is a digital camera.

7. The viewfinder according to claim 1, wherein said electronic device is a cellular phone.

* * * * *